United States Patent [19]

Yoshida

[11] Patent Number: 5,016,093
[45] Date of Patent: May 14, 1991

[54] VIDEO CAMERA SYSTEM WITH WHITE BALANCE ADJUSTMENT

[75] Inventor: Masanobu Yoshida, Kanagawa, Japan

[73] Assignee: Sony Corporation, Tokyo, Japan

[21] Appl. No.: 327,097

[22] Filed: Mar. 22, 1989

[30] Foreign Application Priority Data

Mar. 31, 1988 [JP] Japan ................. 63-079559

[51] Int. Cl.⁵ .................... H04N 9/73; H04N 5/243
[52] U.S. Cl. .......................... 358/41; 358/29
[58] Field of Search ............... 358/41, 51, 29 C, 209, 358/219, 225, 213.16, 213.19, 221, 43, 55, 29

[56] References Cited

U.S. PATENT DOCUMENTS

| | | | |
|---|---|---|---|
| 3,786,177 | 1/1974 | Bazin | 358/29 C |
| 4,472,740 | 9/1984 | Doi | 358/209 |
| 4,486,771 | 12/1984 | Machida et al. | 358/29 C |
| 4,727,413 | 2/1988 | Miura et al. | 358/29 C |
| 4,736,241 | 4/1988 | Murakami et al. | 358/29 C |
| 4,739,393 | 4/1988 | Seki et al. | 358/29 C |
| 4,797,733 | 1/1989 | Takagi et al. | 358/41 |
| 4,819,060 | 4/1989 | Minema et al. | 358/29 C |
| 4,851,897 | 7/1989 | Inuma et al. | 358/41 |
| 4,855,814 | 8/1989 | Shiraishi et al. | 358/41 |
| 4,911,552 | 3/1990 | Kurashige et al. | 358/55 |

FOREIGN PATENT DOCUMENTS

3231810A1 3/1983 Fed. Rep. of Germany .

*Primary Examiner*—Howard W. Britton
*Attorney, Agent, or Firm*—Alvin Sinderbrand; William S. Frommer

[57] ABSTRACT

In a video camera system composed of exchangeable lens devices interchangeably mountable on a camera body having an image pick up element to generate a signal corresponding to a light image projected thereon by an imaging lens of the exchangeable lens device in use, a signal processing circuit responsive to the signal from the image pick up element for providing a color video signal, and a white balance adjusting circuit for correcting the white balance of the color video signal; there are provided a memory for storing white balance correction data characteristic of each of the exchangeable lens devices; and a circuit responsive to the white balance correction data which is characteristic of the one of the exchangeable lens devices mounted on the camera body for correcting operation of the white balance adjusting circuit.

7 Claims, 8 Drawing Sheets

VIDEO CAMERA SYSTEM WITH WHITE BALANCE ADJUSTMENT

RELATED APPLICATION

U.S. patent application Ser. No. 07/301,597, filed Jan. 26, 1989, and having a common assignee herewith.

BACKGROUND OF THE INVENTION

1. Field of the Invention

This invention relates generally to video cameras and, more particularly, is directed to an improved arrangement for effecting automatic white balance adjustment in a video camera system of the type having a camera body on which exchangeable lens devices are interchangeably mountable.

2. DESCRIPTION OF THE PRIOR ART

It is known to provide a video camera with a white balance adjusting circuit. Such video cameras generally comprise a lens assembly for projecting a light image on an image pick up element which may be a charge-coupled-device (CCD) and which provides a corresponding video signal supplied to a signal processing circuit for generating color signals. Any white balance errors included in such color signals are intended to be corrected by the white balance adjusting circuit which may be of a closed-loop type or an open-loop type.

In a video camera provided with a white balance adjusting circuit, red, blue and green color signals provided by the signal processing circuit are supplied through respective amplifiers to a matrix circuit which produces therefrom the usual luminance signal and color difference signals. In the case of a white balance adjusting circuit of the closed-loop type, the outputs of the red and blue color signal amplifiers, which have variable gains, are compared in respective operational amplifiers with the output of the green color signal amplifier to provide red and blue compensation signals which are stored in memories and readable from the latter for controlling the gains of the red and blue color signal amplifiers, respectively. In using a video camera having a closed-loop type white balance adjusting circuit, a white object, for example, a white cap covering the lens assembly, is initially placed in the field of view of the camera and, in the event that there is a white balance error, the white balance adjusting circuit provides red and blue compensation signals that are adapted to vary the gains of the red and blue color signal amplifiers in a manner to cancel such white balance error. The red and blue compensation signals are stored in the respective memories of the camera and are thereafter, during normal operation of the camera, supplied from the memories to the respective variable gain amplifiers for maintaining the desired white balance of the color video signal corresponding to a scene that may then be in the field of view of the camera. However, a video camera having a white balance adjusting circuit of the closed-loop type requires that an initial white balance adjustment be performed before each use of the camera for obtaining the red and blue compensation signals to be stored in the respective memories.

It will be seen that, in a white balance adjusting circuit of the closed-loop type, the stored red and blue compensation correction signals are derived from the main image signal path. On the other hand, in a white balance adjusting circuit of the open-loop type, for example, as disclosed in U.S. Pat. No. 4,646,161, and in Japanese laid-open Utility Model Application No. 61-1982, each of which has a common assignee herewith, an external light sensor assembly is provided to convert white light obtained from a white-scattering plate independently of the main image path into red, green and blue detected signals, whereupon, the red and blue detected signals are compared, in respective operational amplifiers, with the green detected signal to continuously provide red and blue compensation signals, respectively, which are employed for controlling the gains of the red and blue color signal amplifiers for correcting white balance errors. Thus, the white balance is continuously adjusted for obtaining the optimum white balance regardless of fluctuations in the photographing conditions, such as, changes in the ambient illumination and the like. Further, in the case of a white balance adjusting circuit of the open-loop type, the camera operator is freed from the annoying and complicated procedure of providing an initial white balance adjustment for obtaining the compensation or correcting signals to be stored in the memories before the actual use of the camera for providing a picture.

However, in the case of a video camera having a white balance adjusting circuit of the open-loop type, since the white light used for obtaining the compensating or correcting signals is received by an external light sensor arrangement, that is, from outside the main image signal path, as described above, white balance errors introduced in the imaging video signal, for example, by exchanging one lens assembly for another lens assembly having different spectral characteristics, cannot be corrected.

OBJECTS AND SUMMARY OF THE INVENTION

Accordingly, it is an object of the present invention to provide a video camera system having a white balance adjusting circuit which avoids the above described disadvantages of the prior art.

More specifically, it an object of this invention to provide a video camera system having exchangeable lens devices and provided with a white balance adjusting circuit which reliably and conveniently effects white balance adjustment even when the exchangeable lens devices have different spectral characteristics.

Another object of this invention is to provide a video camera system having exchangeable lens devices and provided with a white balance adjusting circuit, as aforesaid, which may be of the closed-loop type or the open-loop type.

In accordance with an aspect of this invention, in a video camera system comprising a camera body, an exchangeable lens device removably mounted on the camera body for receiving incident light, signal processing means in the camera body responsive to the incident light from the exchangeable lens device for providing a color video signal, and white balance adjusting means connected to the signal processing means; memory means are provided for storing white balance correction data characteristic of the exchangeable lens device, and means are responsive to such stored white balance correction data for correcting operation of the white balance adjusting means.

The memory means in the aforesaid video camera system embodying the invention may be a read only memory, and may be provided in each of the exchangeable lens devices. Alternatively, the memory means may include a respective bar-code on each of the exchangeable lens devices which represents the white balance correction data characteristic thereof, and the camera body may contain bar-code reading means for reading the bar-code upon the mounting of the respective one of the exchangeable lens devices on the camera body.

In video camera systems according to still other embodiments of this invention, the memory means for storing white balance correction data characteristic of each of the exchangeable lens devices is provided in the camera body, and each of the exchangeable lens devices includes respective lens identification means for accessing the respective white balance correction data stored in the memory means when the exchangeable lens device is mounted on the camera body. The lens identification means may include an array of mechanical elements, for example, electrical contacts, which, by the arrangement thereof, identifies the respective exchangeable lens device, or the lens identification means may include a memory for storing data identifying the respective exchangeable lens device, or may be in the form of a bar-code provided on the respective exchangeable lens device for identifying the latter and being readable by a bar-code reader on the camera body.

The above, and other objects, features and advantages of the invention, will be apparent in the following detailed description of illustrative embodiments which is to be read in connection with the accompanying drawings forming a part hereof, and wherein the same reference numerals and letters are used to designate corresponding elements and parts in the several views.

DETAILED DESCRIPTION OF THE PREFERRED EMBODIMENTS

Figure 1:
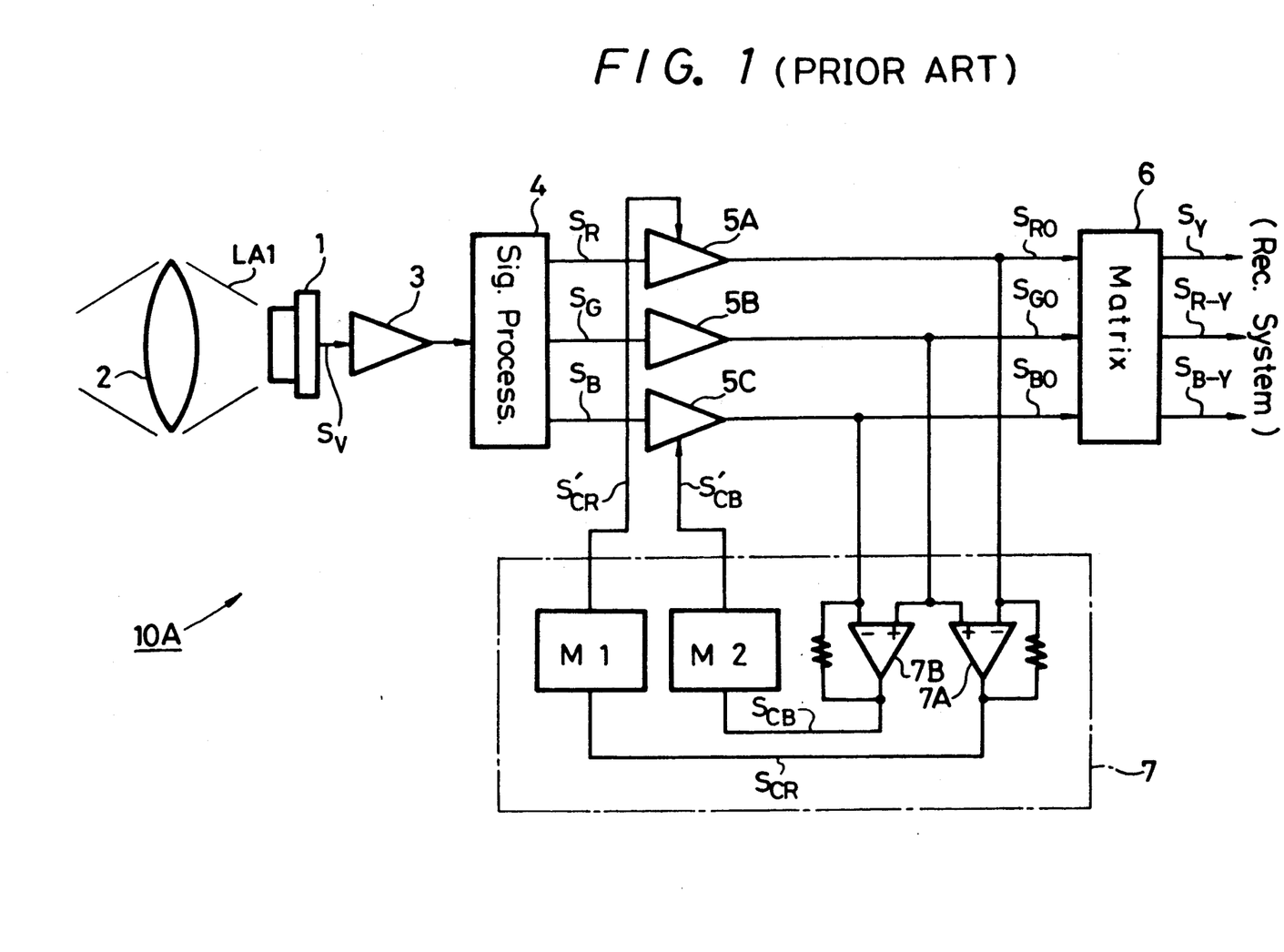
FIG. 1 is a block diagram illustrating a video camera system according to the prior art having a white balance adjusting circuit of the closed-loop type.
Figure 2:
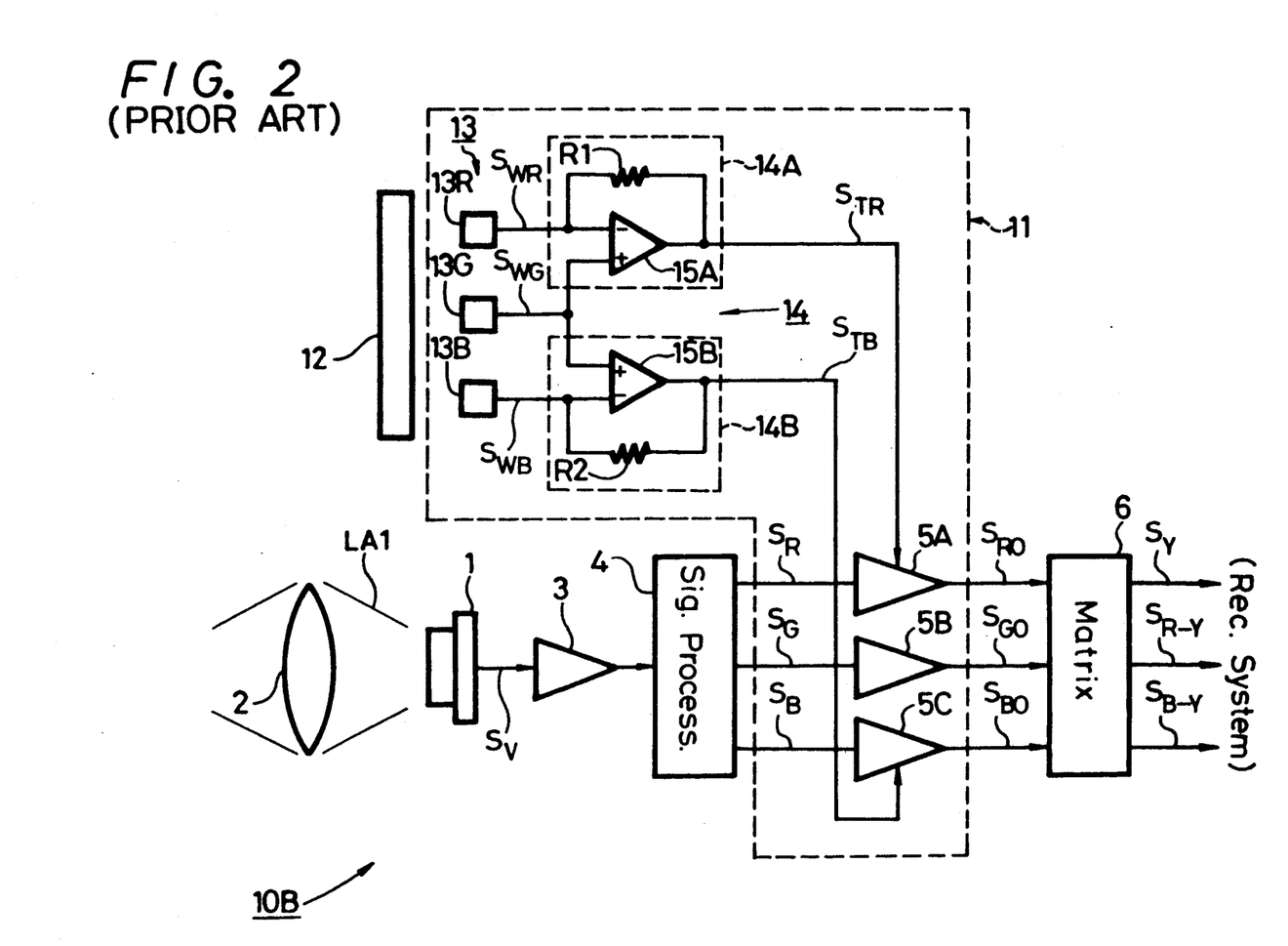
FIG. 2 is a block diagram showing a video camera system according to the prior art having a white balance adjusting circuit of the open-loop type.

Before proceeding with the detailed description of embodiments of the present invention, reference will be made to video camera systems according to the prior art which are shown in FIGS. 1 and 2, and which are respectively provided with white balance adjusting circuits of the closed-loop type and the open-loop type, so that the problems encountered in such video camera systems according to the prior art and which are avoided by the present invention may be better appreciated.

In the video camera system 10A of FIG. 1, an image pickup device or CCD 1 receives incident light LA 1 through an imaging lens or video lens assembly 2 and converts such incident light into a video signal $S_V$. The video signal $S_V$ is supplied through an amplifier 3 to a signal processing circuit 4 in which red, green and blue components $S_R$, $S_G$, and $S_B$, respectively, are derived from the video signal. Such color components or signals $S_R$, $S_G$ and $S_B$ are supplied from the processing circuit 4 to amplifiers 5A, 5B and 5C, of which at least the amplifiers 5A and 5C have variable gains that are suitably controlled for white balance adjustment, as hereinafter described in detail. The resulting output color signals $S_{RO}$, $S_{GO}$ and $S_{BO}$ are supplied from the amplifiers 5A, 5B and 5C, respectively, to a matrix circuit 6 which generates therefrom a luminance signal $S_Y$ and color difference signals $S_{R-Y}$ and $S_{B-Y}$ to be supplied to a recording system or the like (not shown).

As earlier noted, the video camera system 10A according to the prior art has a white balance adjusting circuit 7 of the closed-loop type which includes operational amplifiers 7A and 7B and memories M1 and M2. The operational amplifiers 7A and 7B are shown to have resistive negative feedbacks, and both have their positive inputs connected to the amplifier 5B for receiving the output color signal $S_{GO}$ therefrom. The negative inputs of the amplifiers 7A and 7B are connected to the outputs of the variable gain amplifiers 5A and 5C, respectively, for receiving the output color signals $S_{RO}$ and $S_{BO}$, respectively. Thus, the operational amplifier 7A produces a red compensation signal $S_{CR}$ on the basis of the red color signal $S_{RO}$ output from the amplifier 5A as compared with the green color signal $S_{GO}$ output from the amplifier 5B, and such red compensation signal $S_{CR}$ is stored or written in the memory M1. Similarly, the operational amplifier 7B produces a blue compensation signal $S_{CB}$ on the basis of the blue color signal $S_{BO}$ output from the amplifier 5C as compared with the green output signal $S_{GO}$, and such blue compensation signal $S_{CB}$ is stored or written in the memory M2. The red and blue compensation signals $S_{CR}$ and $S_{CB}$ stored in the memories M1 and M2, respectively, are read therefrom as gain control signals $S'_{CR}$ and $S'_{CB}$ for the amplifiers 5A and 5C, respectively.

When using the video camera system 10A of FIG. 1, a white object, for example, a white lens cap, is initially placed in the field of view of the camera for effecting an initial white balance adjustment. If the output color signals $S_{RO}$, $S_{GO}$ and $S_{BO}$ that are derived from the amplifiers 5A, 5B and 5C give rise to a white balance error during the initial adjustment, that is, when a white lens cap or other white object is in the field of view of the camera, the resulting red and blue compensation signals $S_{CR}$ and $S_{CB}$ generated by the white balance adjusting circuit 7 are such as to correct the white balance error when fed to the amplifiers 5A and 5C, respectively, as gain control signals therefor. The red and blue compensation signals $S_{CR}$ and $S_{CB}$ obtained during such initial white balance adjustment are stored in the memories M1 and M2.

Thereafter, when the video camera system 10A is in normal use for obtaining a picture of a desired object or scene of various colors, the red and blue compensation signals previously stored in the memories M1 and M2 are supplied therefrom as the gain control signals $S'_{CR}$ and $S'_{CB}$ to the amplifiers 5A and 5C, respectively. Thus, the gains of the amplifiers 5A and 5C are suitably varied so that the red and blue color output signal $S_{RO}$ and $S_{BO}$ from the amplifiers 5A and 5C are adjusted relative to the green color output signal $S_{GO}$ for obtaining the correct white balance.

As earlier noted, a video camera having a white balance adjusting circuit of the closed-loop type, as in FIG. 1, requires that an initial white balance adjustment be performed before each use of the camera for providing the red and blue compensation signals $S_{CR}$ and $S_{CB}$ to be stored in the respective memories M1 and M2, and this is obviously an onerous inconvenience.

Referring now to FIG. 2, it will be seen that, in a video camera system 10B having a white balance adjusting circuit 11 of the open-loop type according to the prior art as there shown, those elements of the video camera system 10B which correspond to previously described elements of the video camera system 10A are identified by the same reference numerals and letters, and again will not be described herein. The white balance adjusting circuit 11 of the open-loop type receives white light scattered by a white-scattering plate 12 which is independent of the main image signal path of the camera system 10B constituted by the video lens assembly 2, the image pickup device 1, the amplifier 3 and the signal processing circuit 4. The white balance adjusting circuit 11 is shown to include a light sensing assembly 13 including a red-component sensor 13R, a green-component sensor 13G and blue-component sensor 13B which convert the white light scattered by the plate 12 into a red detected signal $S_{WR}$, a green detected signal $S_{WG}$ and a blue detected signal $S_{WB}$, respectively, which are supplied to a gain control circuit 14 also included in the white balance adjusting circuit 11.

The gain control circuit 14 is shown to include a first gain control unit 14A of an inverting amplifier type comprised of an operational amplifier 15A and a resistor R1 connected as a negative feedback, and a second gain control unit 14B also of an inverting amplifier type and similarly comprised of an operational amplifier 15B and a resistor R2 connected as a negative feedback. The green detected signal $S_{WG}$ from the sensor 13G is shown to be applied to the positive inputs of both operational amplifiers 15A and 15B, while the red and blue detected signals $S_{WR}$ and $S_{WB}$ are applied to the negative inputs of the amplifiers 15A and 15B, respectively. The gain control unit 14A generates a red compensation signal $S_{TR}$ as the result of the subtraction of the red detected signal $S_{WR}$ from the green detected signal $S_{WG}$, and which is applied to the amplifier 5A for controlling the gain of the latter. Similarly, the gain control unit 14B generates a blue compensation signal $S_{TB}$ as the result of the subtraction of the blue detected signal $S_{WB}$ from the green detected signal $S_{WG}$, and which is applied to the amplifier 5C for controlling the gain of the latter.

Since the white balance adjusting circuit 11 of the open-loop type provides the red compensation signal $S_{TR}$ and the blue compensation signal $S_{TB}$ on the basis of white light obtained by means of the white scattering plate 12, that is, independently of the main image signal path, the white balance can be always adjusted to the optimum condition regardless of fluctuations in the photographing conditions, such as, changes in the ambient illumination and the like. Further, the operator of the camera is freed from the inconvenience of performing a white balance adjustment before the normal operation of the camera for obtaining a picture, as in the white balance adjusting circuit of the closed-loop type described with reference to FIG. 1. However, in the video camera system 10B having a white balance adjusting circuit 11 of the open-loop type, since the circuit 11 acts in response to white light received from the scattering plate 12, that is, independent of the main image signal path which includes the lens assembly 2, if white balance errors occur by reason of changes in the main image signal path, for example, as a result of exchanging one lens assembly for another lens assembly having different spectral characteristics, such white balance errors cannot be corrected by the white balance adjusting circuit 11.

Similarly, in the case of the video camera system 10A having the white balance adjusting circuit 7 of the closed-loop type, if such camera system is provided with exchangeable lens devices having different spectral characteristics which are not controllable by the white balance adjusting circuit 7, it will be impossible to properly effect the white balance adjustment.

Figure 3:
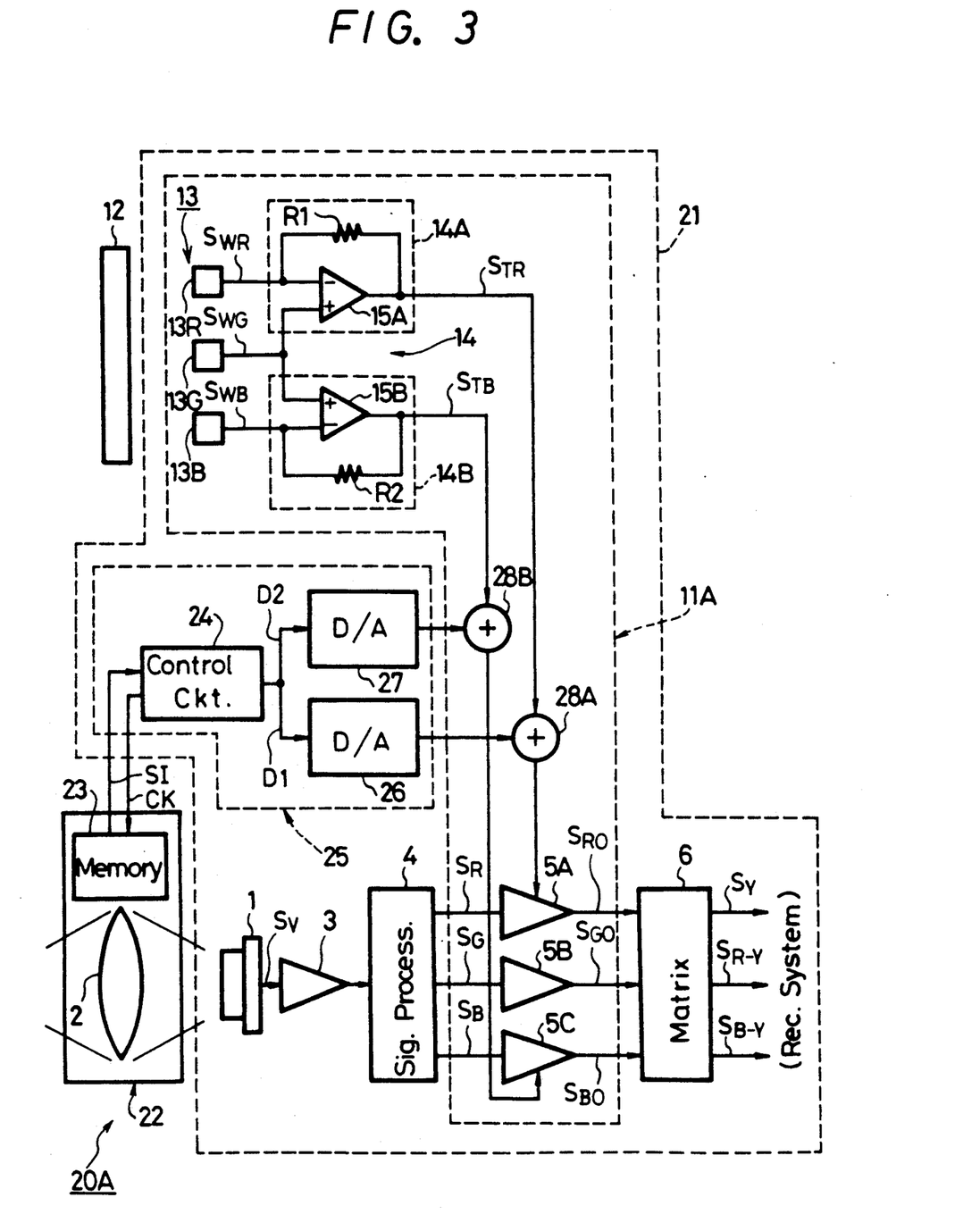
FIG. 3 is a block diagram showing an embodiment of the present invention applied to a video camera system having an open-loop type white balance adjusting circuit.

Referring now to FIG. 3 in which the present invention is shown applied to a video camera system 20A generally composed of a camera body 21 on which a selected one of a plurality of exchangeable lens devices 22 is removably mounted. Each exchangeable lens device 22 is shown to include a respective lens assembly 2 and a memory 23, for example, in the form of a read-only-memory (ROM) in which there is stored, in advance, white balance correction data SI for use in correcting white balance errors resulting from spectral characteristics peculiar to the respective lens assembly 2.

When the exchangeable lens device 22 is mounted on the video camera body 21, the white balance correction data SI stored in the memory 23 of the exchangeable lens device 22 is read out in synchronism with a clock signal CK supplied by a control circuit 24 which may be in the form of a micro-computer included in a white balance correcting circuit 25 provided in the camera body 21. The control circuit 24 responds to the white balance correction data SI read out from the memory 23 to provide red correction data D1 and blue correction data D2 which are applied to digital-to-analog (D/A) converting circuits 26 and 27, respectively.

The video camera system 20A is further shown to have, as part of its camera body 21, a white balance adjusting circuit 11A of the open-loop type that is generally similar to the white balance adjusting circuit 11 described above with reference to FIG. 2, and has its corresponding elements identified by the same reference numerals. However, the white balance adjusting circuit 11A additionally includes adding circuits 28A and 28B interposed in the lines through which the red compensation signal $S_{TR}$ and the blue compensation signal $S_{TB}$, respectively, are applied, as gain control signals, to the amplifiers 5A and 5C. The adding circuits 28A and 28B further have inputs connected to outputs of the D/A converting circuits 26 and 27, respectively.

Thus, the adding circuit 28A is operative to add the output of the D/A converting circuit 26 to the red compensation signal $S_{TR}$ for providing the gain control signal for the amplifier 5A, while the adding circuit 28B is operative to add the output of the D/A converting circuit 27 to the blue compensation signal $S_{TB}$ for providing the gain control signal for the amplifier 5C.

In the operation of the video camera system 20A according to this invention, when one exchangeable lens device 22 is removed from the camera body 21 and replaced by another exchangeable lens device 22, the white balance correction data SI stored in the white balance correction data memory 23 of the newly mounted lens device 22 is read from the memory 23 and passed to the white-balance correction circuit 24 which derives therefrom the corresponding red correction data D1 and the blue correction data D2. Such red correction data D1 and blue correction data D2 are converted in the circuits 26 and 27, respectively, to corresponding analog correction signals supplied to the adder circuits 28A and 28B, respectively. Thus, the gain control signals for the amplifiers 5A and 5C are represented by the red and blue compensation signals $S_{TR}$ and $S_{TB}$ as modified by the analog outputs of the converting circuits 26 and 27, respectively. Accordingly, the output color signals $S_{RO}$, $S_{GO}$ and $S_{BO}$ from the amplifiers 5A, 5B and 5C have their white balance properly adjusted both with reference to the sensing of the light from the white scattering plate 12 by the sensors 13R, 13G and 13B of the white balance adjusting circuit 11A, and also with reference to the particular spectral characteristics of the lens assembly included in the exchangeable lens device 22 then mounted on the camera body 21.

In the embodiment of this invention described with reference to FIG. 3, the white balance correction data SI characteristic of the exchangeable lens device 22 is stored in the memory 23 which is made a part of the exchangeable lens device 22, but it is to be understood that other arrangements may be provided in accordance with the invention for storing the white balance correction data characteristic of each of the exchangeable lens devices, and for correcting the operation of the white balance adjusting circuit in accordance with the stored white balance correction data corresponding to the exchangeable lens device then mounted on the camera body.

Figure 4:
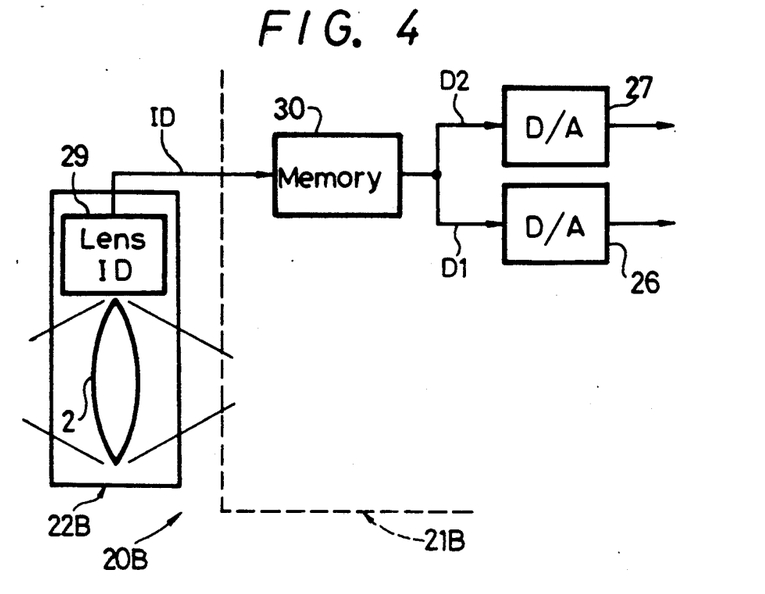
FIG. 4 is a fragmentary block diagram illustrating another embodiment of the present invention which, apart from the elements shown on FIG. 4, is the same as the video camera system shown on FIG. 3.

Thus, for example, as shown in FIG. 4, in a video camera system 20B according to another embodiment of this invention which is otherwise the same as the camera system 20A described with reference to FIG. 3, each of the exchangeable lens devices 22B removeably mountable on the camera body 21B includes merely a lens identification device 29 which is operative, upon the mounting of the respective exchangeable lens device 22B on the camera body 21B, to provide a lens identification signal ID which identifies the respective exchangeable lens device. The signal ID is employed for accessing corresponding white balance correction data D1 and D2 stored in a memory 30 which replaces the control circuit 24 in FIG. 3. Apart from the foregoing, the video camera system 20B operates similarly to the previously described camera system 20A so that analog signals corresponding to the white balance correction data D1 and D2 are derived from the D/A converting circuits 26 and 27 and are added to the red compensation signal $S_{TR}$ and the blue compensation signal $S_{TB}$ (FIG. 3) for providing the gain control signals for the amplifiers 5A and 5C. Thus, the white balance adjustment is achieved with proper correction for changes in the spectral characteristics of the lenses 2 included in the exchangeable lens device 22B that can be mounted on the camera body 21B.

Although FIGS. 3 and 4 illustrate embodiments of the invention employing white balance adjusting circuits of the open-loop type, it is to be appreciated that the invention is not so limited, but can be also applied to video camera systems having white balance adjusting circuits of the closed-loop type.

Figure 5:
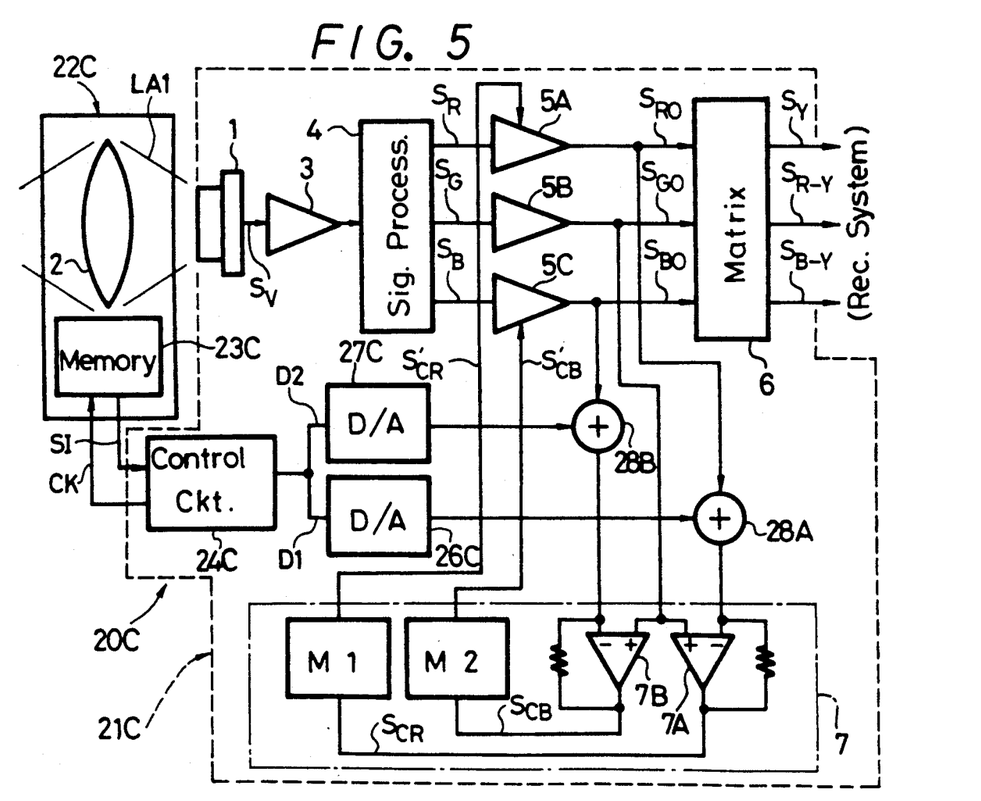
FIG. 5 is a block diagram showing still another embodiment of this invention applied to a video camera system having a white balance adjusting circuit of the closed-loop type as shown on FIG. 1.

For example, as shown in FIG. 5, the present invention may be applied to a video camera system 20C comprised of exchangeable lens devices 22C which are removably and interchangeably mountable on a camera body 21C provided with a white balance adjusting circuit 7 of the type described with reference to FIG. 1. In the video camera system 20C of FIG. 5, each of the exchangeable lens devices 22C is provided with a memory 23C which, as in the case of the embodiment of this invention described with reference to FIG. 3, stores white balance correction data SI corresponding to the spectral characteristics of the lens assembly 2 included in the respective exchangeable lens device 22C. Upon the mounting of a particular lens device 22C on the camera body 21C, the respective white balance correction data SI is read out of the memory 23C to a control circuit 24C in the camera body 21C in response to a clock signal CK from such control circuit 24C. Similarly to the arrangement described with reference to FIG. 3, the control circuit 24C provides, from the data SI, corresponding red and blue correction data D1 and D2 applied to D/A converting circuits 26C and 27C for providing corresponding analog signals to be added to the output color signals $S_{RO}$ and $S_{BO}$, respectively, in adding circuits 28A and 28B. Finally, in FIG. 5, the outputs of the adding circuits 28A and 28B are applied to the negative inputs of the operational amplifiers 7A and 7B of the white balance adjusting circuit 7 of the closed-loop type.

It will be apparent that, when any one of the exchangeable lens devices 22C is mounted on the camera body 21C, and an initial white balance adjustment is performed with a white lens cap disposed in covering relation to the lens assembly 2, the red and blue compensation signals stored in the memories M1 and M2 are determined both with reference to any white balance errors that may be perceived in respect to the white light provided by the white lens cap in use, and also with reference to the particular spectral characteristics of the lens assembly 2 included in the mounted exchangeable lens device 22C, as represented by the white balance correction data SI from the memory 23C. Thereafter, when the camera system 20C is in normal use with the same exchangeable lens device 22C mounted on the camera body 21C, the signals $S'_{CR}$ and $S'_{CB}$ read out of the memories M1 and M2 as gain control signals for the amplifiers 5A and 5C ensure the maintenance of the desired white balance adjustment.

Figure 6:
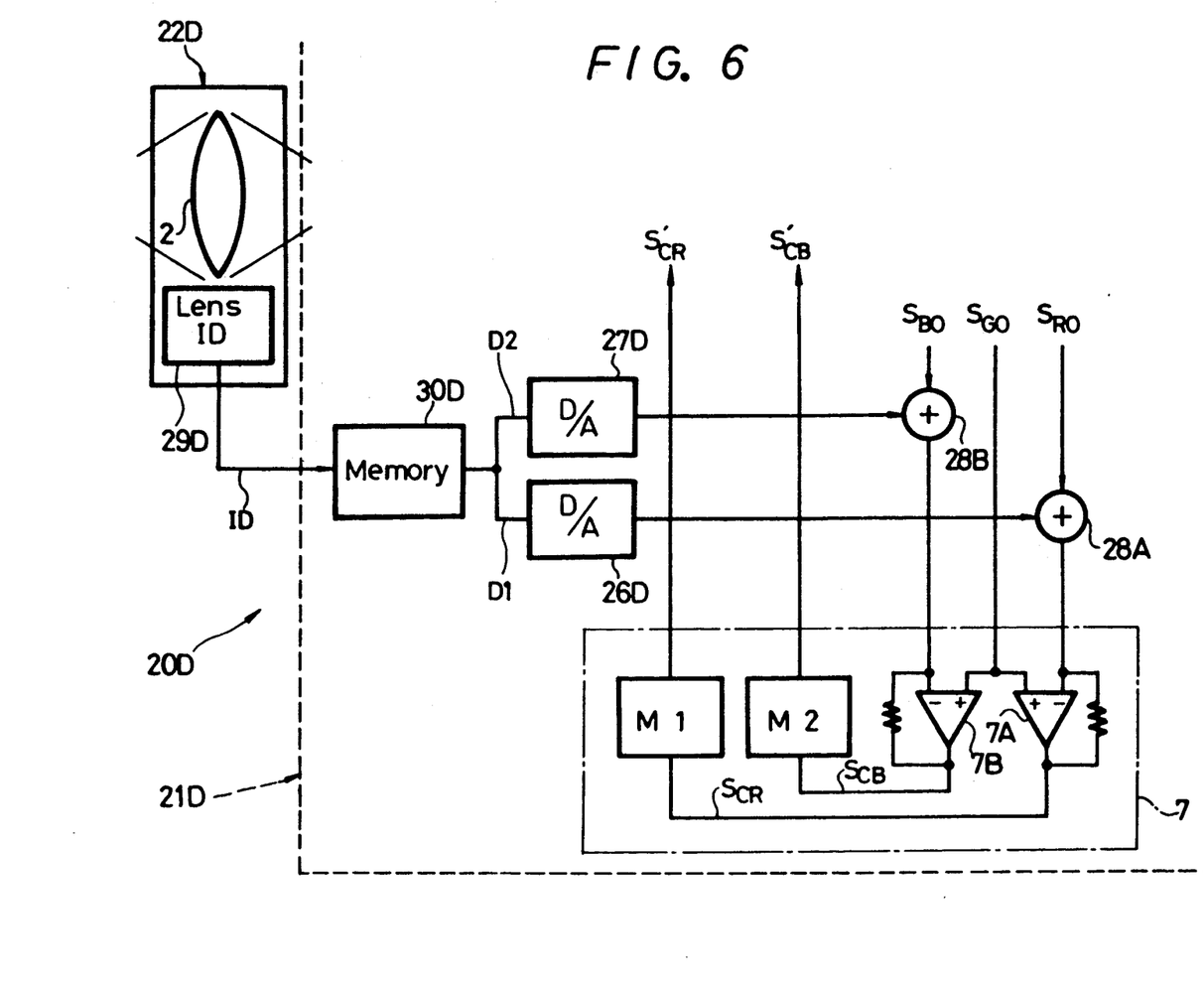
FIG. 6 is a fragmentary block diagram showing still another embodiment of this invention which differs from the video camera system shown on FIG. 5 only in respect to elements illustrated on FIG. 6.

Referring now to FIG. 6, it will be seen that the video camera system 20D thereshown also illustrates the application of the present invention to a white balance adjusting circuit of the closed-loop type. However, in the video camera system 20D, an arrangement similar to that described with reference to FIG. 4 is employed. More specifically, each of the exchangeable lens devices 22D removably mountable on a camera body 21D includes a lens identification device 29D which provides a lens identification signal ID to a memory 30D within the camera body 21D. The lens identification signal ID accesses the white balance correction data D1 and D2 previously stored in the memory 30D in correspondence to the particular spectral characteristics of the respective exchangeable lens device 22D. Thus, once again, in the video camera system 20D, the red and blue compensation signals $S_{CR}$ and $S_{CB}$ stored in the memories M1 and M2 during the initial white balance adjustment, and which are thereafter read out of the memories M1 and M2 as the gain control signals $S'_{CR}$ and $S'_{CB}$, compensate for the white balance errors occurring during the initial adjustment, for example, due to variations in the whiteness of the white lens cap used for such initial adjustment, and also compensate for the particular spectral characteristics of the lens device 22D used at the time of the initial adjustment.

In describing the video camera systems 20B and 20D with reference to FIGS. 4 and 6, merely general reference has been made to the lens identification devices 29 and 29D, respectively. However, such lens identification devices can be of various types. For example, as shown on FIGS. 7A and 7B, the lens identification device 29 or 29D on each exchangeable lens device 22B or 22D may be substantially of a mechanical nature. More specifically, as shown on FIG. 7B, for mounting each exchangeable lens device 22B or 22D on the camera body 21B or 21D, the wall or face of the exchangeable lens device which faces the camera body when mounted thereon is conventionally provided with a socket 71 formed with an axially extending groove 71A which, at its inner end, communicates with a circumferential groove 71B. Further, for mounting the exchangeable lens device 22B or 22D on the respective camera body, the latter is provided with a boss (not shown) engageable in the socket 71 and having a radially projecting pin 71A' (shown in broken lines on FIG. 7B) which is adapted to pass through the axial groove 71A into the circumferential groove 71B when the boss is received in the socket 71. Thereafter, the exchangeable lens device 22B or 22D can be turned, for example, in the direction of the arrow A, through approximately 180° so as to position the projecting pin 71A' within the circumferential groove 71B as shown on FIG. 7B and thereby lock or retain the selected exchangeable lens device on the camera body.

Figure 7A:
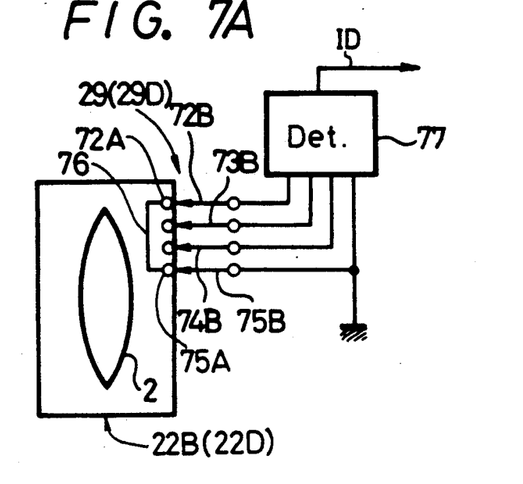
FIGS. 7A and 7B, FIGS. 8A and 8B, and FIG. 9 are schematic views illustrating respective examples of identification arrangements that may be provided for the exchangeable lens devices in the embodiments of FIGS. 4 and 6.
Figure 7B:
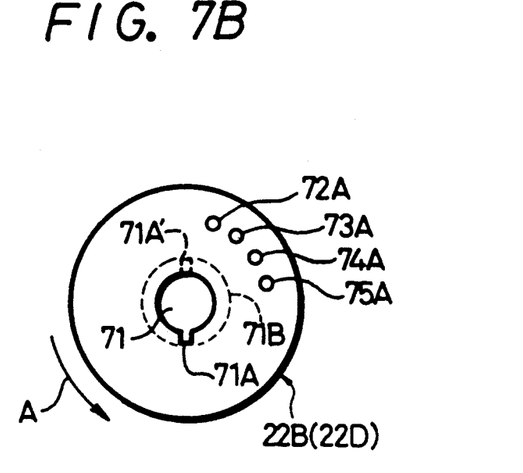

Further, as shown on FIG. 7B, the wall or face of the exchangeable lens device which confronts the camera body when mounted on the latter has a series of openings 72A, 73A, 74A and 75A which are spaced apart along an arcuate line spaced radially from the center of rotation, that is, the center of the socket 71. When the attachment of an exchangeable lens device to the camera body has been completed, conductive terminals 72B, 73B, 74B and 75B which are similarly located on the camera body and suitably spring-biased will enter the small openings 72A, 73A, 74A and 75A, respectively, as schematically represented on FIG. 7A. The terminal 75B is shown to be connected to ground, while a selected one of the openings 72A, 73A and 74A has a contact therein electrically connected, as at 76, to a contact in the opening 75A. Thus, when the exchangeable lens device shown on FIG. 7A is mounted on the camera body, the terminals 72B, 73B, 74B and 75B enter the openings 72A, 73A, 74A and 75A, respectively. At such time, the contact within one of the openings 72A, 73A and 74A, that is, within the opening 72A in the specific arrangement shown on FIG. 7A, is connected to ground through the conductor 76 extending to the opening 75A and engaged by the grounded terminal 75B. Thus, the terminal 72B extending into the opening 72A and engaging the contact therein is also grounded and this condition is suitably detected by a detector 77 within the camera body for providing the corresponding lens identification signal ID to the memory 30 or 30D on FIG. 4 or FIG. 6, respectively. It will be appreciated that, by selectively connecting the conductor 76 from the contact within the opening 75A to a contact within any one of the openings 72A, 73A and 74A, three different exchangeable lens devices can be identified.

Figure 8A:
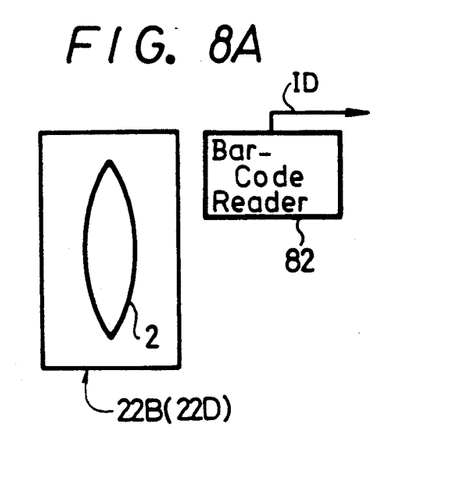
Figure 8B:
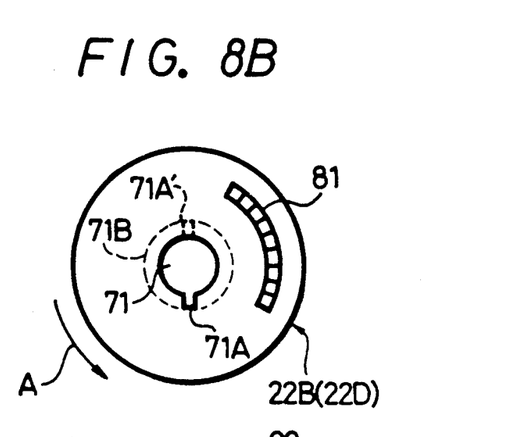

FIGS. 8A and 8B illustrate another lens identification device that can be associated with each of the exchangeable lens devices 22B or 22D, and in which the face of each exchangeable lens device which confronts the camera body when secured thereon in the same conventional manner as described above with reference to FIG. 7B is further provided with an arcuate plate 81 on which a bar-code identifying the respective lens device is impressed or printed. During the turning of the exchangeable lens device in the direction of the arrow A on FIG. 8B for securing the same on the camera body in the usual manner, a bar-code reader 82 provided on the camera body (FIG. 8A) reads the bar-code on the plate 81 for generating the respective lens identification signal ID.

Figure 9:
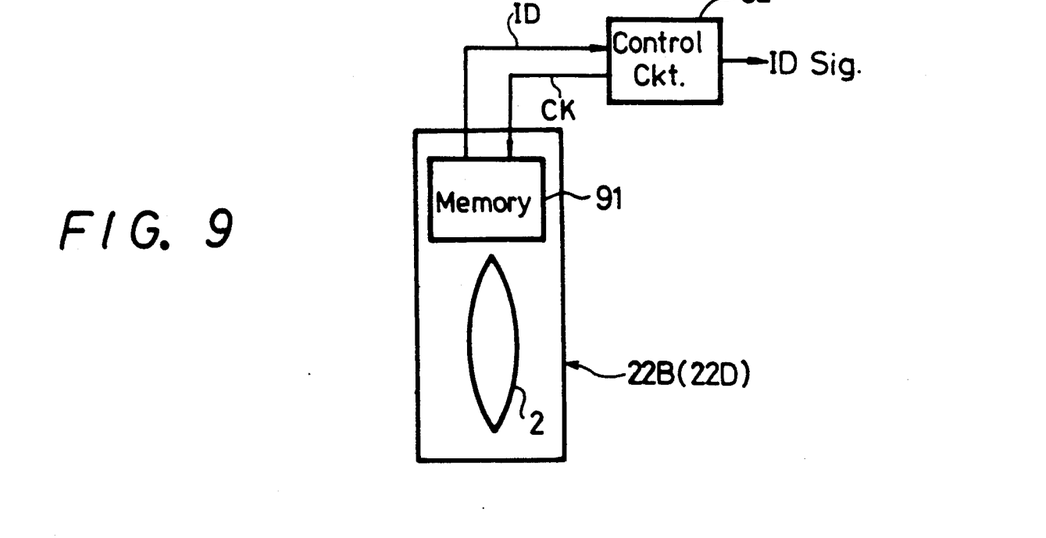

Referring now to FIG. 9, it will be seen that another form of lens identification device that may be associated with each of the exchangeable lens devices 22B or 22D in FIGS. 4 and 6 includes a memory 91, for example, in the form of a ROM, situated in the respective exchangeable lens device and storing lens identification data ID, as distinguished from white balance correction data SI, as in the memories 23 and 23C in FIGS. 3 and 5, respectively. When the exchangeable lens device 22B or 22D is mounted on the camera body, a control circuit 92 included in the camera body is operative to provide the clock signal CK for reading from the memory 91 the lens identification data or signal ID which accesses the memory 30 or 30D in FIG. 4 or FIG. 6 to obtain the respective stored white balance correction data $D_1$ and $D_2$.

Figure 10:
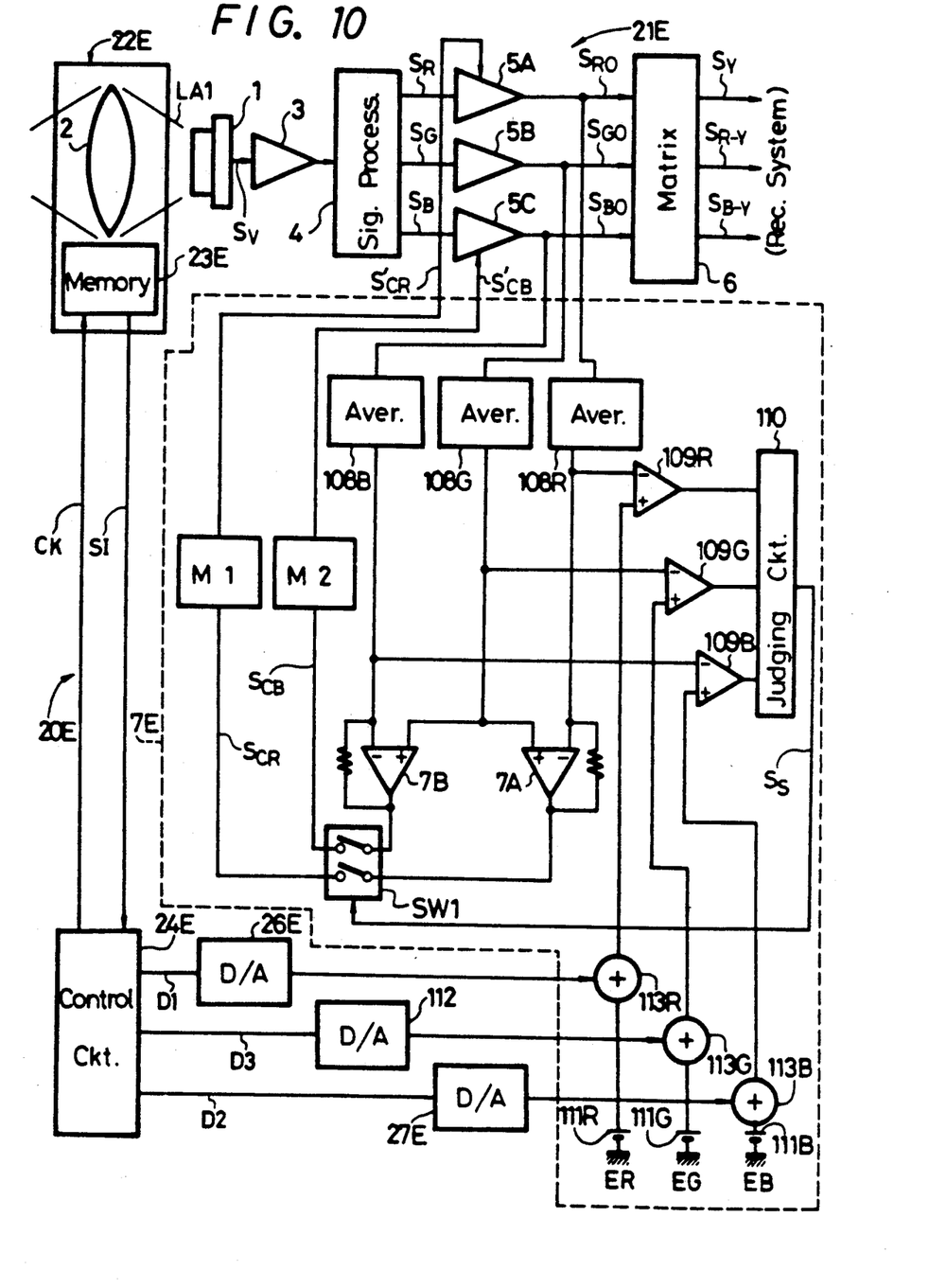
FIGS. 10 and 11 are block diagrams illustrating video camera systems according to respective further embodiments of the invention.

Referring now to FIG. 10, it will be seen that a video camera system 20E according to an embodiment of this invention may be provided with a fully-automatic white balance adjusting circuit of the closed-loop type. Such fully-automatic white balance adjusting circuit of the closed-loop type is to be distinguished from the white balance adjusting circuits 7 of the closed-loop type included in the embodiments of the invention described above with reference to FIGS. 5 and 6, and in which a white lens cap or the like has to be interposed in the field of view of the lens assembly 2 included in the exchangeable lens device 22C or 22D during an initial adjustment of the white balance. On the other hand, in the white balance adjusting circuit 7E included in the camera body 21E of the video camera system 20E according to the embodiment of the present invention shown in FIG. 10, such white lens cap or its equivalent is not required and a sufficiently white signal is automatically detected from the input video signal $S_V$ provided by the image pickup device 1 in response to the projection of an image thereon by the lens assembly 2 of the exchangeable lens device 22E then mounted on the camera body 21E. Such automatically detected white signal is then employed for effecting the white balance correction.

More specifically, in the video camera system 20E according to the embodiment of the present invention shown on FIG. 10, the output color signals $S_{RO}$, $S_{GO}$ and $S_{BO}$ from the amplifiers 5A, 5B and 5C are supplied to averaging circuits 108B, 108G and 108R, respectively, in which such output color signals are averaged for a predetermined time period, for example, for more than 6 field intervals. The averaged outputs from the averaging circuits 108G and 108R are supplied to the positive and inverted terminals, respectively, of the operational amplifier 7A. Similarly, the averaged outputs of the averaging circuits 108G and 108B are supplied to the positive and inverted inputs of the operational amplifier 7B. The output signals from the operational amplifiers 7A and 7B are supplied through a switching circuit SW1, upon closing of the latter, as the red and blue compensation signals $S_{CR}$ and $S_{CB}$ to be stored in the memories M1 and M2, respectively. Such red and blue compensation signals stored in the memories M1 and M2 are read from the respective memories as the gain control signals $S'_{CR}$ and $S'_{CB}$ for the variable gain amplifiers 5A and 5C so as to effect white balance adjustment. In other words, when the switching circuit SW1 is closed or turned ON, a so-called closed-loop control operation is performed in which the output levels of the averaging circuits 108R and 108B are made equal to the output level of the averaging circuit 108G.

Further, in the white balance adjusting circuit 7E according to the embodiment of the invention shown on FIG. 10, the outputs of the averaging circuits 108R, 108G and 108B are applied to inverted inputs of comparators 109R, 109G and 109B, respectively, which have their outputs supplied to a judging circuit 110. Reference voltage sources 111R, 111G and 111B supply predetermined reference voltages ER, EG and EB, respectively, to positive inputs of the comparators 109R, 109G and 109B, respectively. The judging circuit 110 is operative to determine, from the outputs of the comparators 109R, 109G and 109B, whether the incident light LA1 projected on the pickup element 1 is a normal or substantially white light, or an abnormal light. Thus, for example, when the level of one of the red, green and blue signal components $S_R$, $S_G$ and $S_B$ is extraordinarily high or low in comparison with the other two color components, the judging circuit 110 determines, from the corresponding outputs of the comparators 109R, 109G and 109B, that the incident light LA1 is abnormal and, in response to such determination, provides a switch control signal $S_s$ by which the switching circuit SW1 is turned OFF. In other words, the previously described closed-loop control is effected only when the incident light LA1 is determined to be a normal or substantially white light in response to which the judging circuit 110 provides the control signal $S_s$ at a level to turn ON the switching circuit SW1. On the other hand, when the incident light LA1 is determined to be abnormal so that the switching circuit SW1 is turned OFF, and the values of the red and blue compensation signals $S_{CR}$ and $S_{CB}$ stored in the memories M1 and M2, respectively, remain unchanged.

Further, in the embodiment of the invention shown on FIG. 10, each exchangeable lens device 22E for removable mounting on the camera body 21E includes a memory 23E which, as in the embodiment of FIG. 5, stores white balance correction data SI corresponding to the spectral characteristics of the lens assembly 2 included in the respective exchangeable lens device 22E. Upon the mounting of a particular lens device 22E on the camera body 21E, the respective white balance correction data SI is read out of the memory 23E to a control circuit 24E in the camera body 21E in response to a clock signal CK from such control circuit. Similarly to the arrangement described with reference to FIG. 5, the control circuit 24E provides, from the data SI, corresponding red and blue correction data D1 and D2 applied to D/A converting circuits 26E and 27E, respectively. The control circuit 24E additionally provides, from the data SI, green correction data D3 applied to a D/A converting circuit 112. The D/A converting circuits 26E, 27E and 112 provide analog signals corresponding to the red, blue and green correction data D1, D2 and D3, respectively, to be added, in adding circuits 113R, 113B and 113G, to the reference voltages ER, EB and EG from the sources 111R, 111B and 111G. Thus, it will be apparent that the reference voltages actually applied to the comparators 109R, 109B and 109G are modified somewhat by the analog signals from the converters 26E, 27E and 112, respectively, that is, in accordance with the spectral characteristics of the lens assembly included in the exchangeable lens device 23E, for thereby effecting the white balance correction in accordance with this invention.

Figure 11:
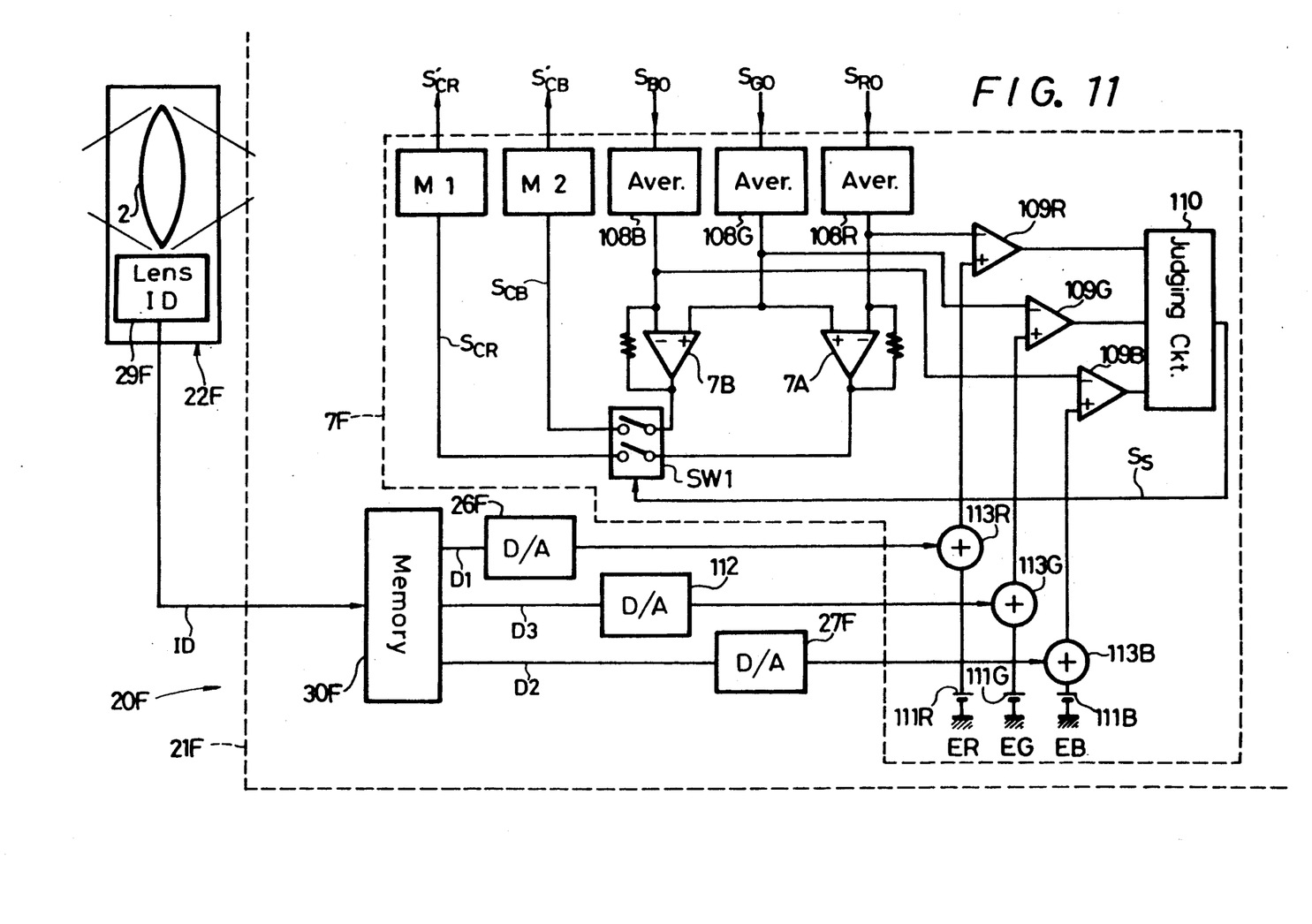

Referring now to FIG. 11, it will be understood that the video camera system 20F according to the embodiment of the invention there partially illustrated generally comprises a camera body 21F on which an exchangeable lens device 22F is removably mounted, and is generally similar to the video camera system 20E described above with reference to FIG. 10. In fact, the video camera system 20F differs from the video camera system 20E only in that, similarly to the video camera system 20B of FIG. 4, each exchangeable lens device 22F includes merely a lens identification device 29F which is operative, upon the mounting of the respective exchangeable lens device 22F on the camera body 21F, to provide a lens identification signal ID which identifies the respective exchangeable lens device. In the video camera system 20F, the signal ID from lens identification device 29F is employed for accessing corresponding white balance correction data D1, D2 and D3 stored in a memory 30F which replaces the control circuit 24E in FIG. 10. The white balance correction data D1, D2 and D3 is supplied from the memory 30F to the D/A converting circuits 26F, 27F and 112 to provide the corresponding analog signals supplied to the adding circuits 113R, 113B and 113G for suitably modifying the reference voltages ER, EB and EG for achieving the desired white balance adjusting correction.

It will be apparent that, in all of the above described embodiments of the invention, since white balance correction data for each of the exchangeable lens devices is stored in a suitable memory and is used to modify the correction signals for white balance adjustment, it is possible to provide a video camera system that can accurately and reliably adjust the white balance even when using exchangeable lens devices having different spectral characteristics.

Although illustrative embodiments of the invention have been described in detail herein with reference to the accompanying drawings, it is to be understood that the is not limited to those precise embodiments, and that various changes and modifications may be effected therein by one skilled in the art without departing from the scope or spirit of the invention as defined in the appended claims.

what is claimed is:

1. A video camera system comprising:
a camera body including image pickup means operative to provide a signal corresponding to a light image projected onto said pickup means, signal processing means responsive to said signal from said image pickup means for providing a color video signal, and white balance adjusting means connected to said signal processing means for correcting the white balance of said color video signal;
exchangeable lens devices interchangeably mountable on said camera body and each including imaging lens means for projecting said light image onto said image pickup means;
socket means provided on each exchangeable lens device having respective electrical interconnections uniquely identifying said lens device;
conductive terminals provided on said camera body for engaging said socket means when a lent device is mounted on said camera body and thereby produce a lens identifying signal determined by the electrical interconnections of said socket means;
memory means provided in said camera body for storing white balance correction data characteristic of each of said exchangeable lens devices;
means responsive to said lens identifying signal for reading from said memory means the white balance correction data characteristic of the lens device then mounted on said camera body; and
means responsive to said white balance correction data read from said memory means for correcting operation of said white balance adjusting means.

2. A video camera system according to claim 1; wherein said memory means includes a read only memory.

3. A video camera system according to claim 1; wherein said white balance adjusting means is of an automatic open-loop type.

4. A video camera system according to claim 1; wherein said white balance adjusting means is of an automatic closed-loop type.

5. A video camera system comprising:
a camera body including image pickup means operative to provide a signal corresponding to a light image projected onto said pickup means, signal processing means responsive to said signal from said image pickup means for providing a color video signal, and an automatic closed-loop type white balance adjusting means connected to said signal processing means for correcting the white balance of said color video signal;
exchangeable lens devices interchangeably mountable on said camera body and each including imaging lens means for projecting said light image onto said image pickup means;
memory means for storing white balance correction data characteristic of each of said exchangeable lens devices; and
means responsive to said white balance correction data which is characteristic of the one of said exchangeable lens devices then mounted on said camera body for correcting operation of said white balance adjusting means; said white balance adjusting means including variable gain amplifier means controllable for varying the level of color components of said color video signal relative to each other, averaging means for averaging each of said color components from said amplifier means for a predetermined period, means for providing color compensating signals from the averaged color components, storage means for storing said color compensating signals to be applied as gain control signals to said amplifier means for effecting white balance adjusting, and means for applying said color compensating signals to said storage means for storage in the latter only when said averaged color components have respective levels that are substantially in a predetermined proportional relation to each other.

6. A video camera system according to claim 5; wherein said means for applying said color compensating signals to said storage means includes switch means through which said color compensating signals pass to said storage means when said switch means is ON, means for comparing each of said averaged color components with a respective reference signal, and switch control means responsive to the comparison of each of said averaged color components with said respective reference signal for turning ON said switch means only when each said comparison is substantially characteristic of white light incident on said exchangeable lens device.

7. A video camera system according to claim 6; wherein said means for correcting operation of said white balance adjusting means includes means for changing each said reference signal in accordance with said white balance correction data.

* * * * *